Patented July 27, 1937

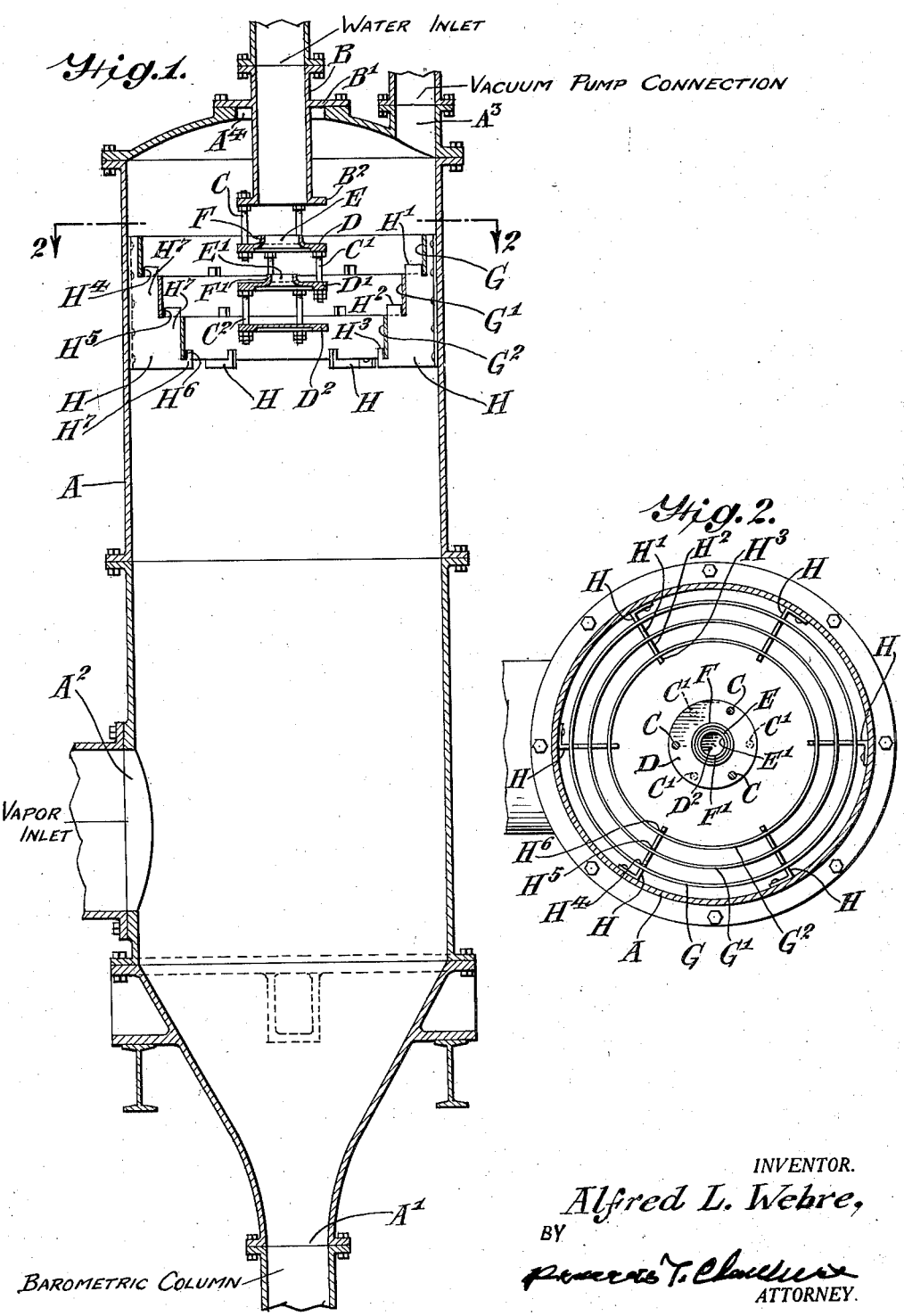

2,088,124

UNITED STATES PATENT OFFICE 2,088,124

CONDENSER

Alfred L. Webre, Merion, Pa., assignor to United States Pipe & Foundry Company, Burlington, N. J., a corporation of New Jersey Application February 26, 1936, Serial No. 65,782

1 Claim. (Cl. 261—118)

My invention relates to counter-current condensers of the type in which a vertical casing is provided with a steam inlet and water outlet at its bottom and an outlet for noncondensable gases at its top and with an inlet for water also provided at the top of the casing and the object of my invention is to provide in such a condenser a very efficient system of water distribution with provision for the convenient removal of certain portions of the distributing apparatus whereby convenient access is provided for cleaning, repairs and the like, both to the removed and unremoved portions of such apparatus. The distributing apparatus which I employ consists essentially of a series of ring baffles located at different heights in the vertical condenser casing and of progressively smaller diameter from above downward, a series of approximately horizontal deflecting plates, one located opposite to each ring baffle, in which the upper deflecting plates are provided with central circular orifices of progressively smaller diameter from above downward and a water inlet nozzle adapted to deliver a cylindrical column of water of greater diameter than that of the orifice in the uppermost deflecting plate, the construction being such that a portion of the water column passes through the orifice in the upper plate while the remainder contacts with the surface of the plate and is deflected outward against the corresponding ring baffle, the same operation taking place with regard to the column of water passing through the orifice in the first plate and partly passing through and partly contacting with the second plate, etc., and my invention consists in providing at the top of the casing an aperture of greater diameter than that of the uppermost deflecting plate and a cover plate for said orifice through which extends the water inlet nozzle and to which are suspensively attached the series of deflecting plates so that the deflecting plates are made readily removable with the cover and thereby all parts of the distributing apparatus made readily accessible for cleaning, repair or the like.

In the drawing:

Figure 1 is a vertical central section and

Figure 2 is a plan view taken on the cross-sectional line 2—2 of Fig. 1.

In the drawing, A is the casing having an outlet $A^1$ at its bottom which should, as indicated, be connected to a barometric column. $A^2$ is an inlet for vapor or steam, $A^3$ an outlet for gas which should be connected, as indicated, to a vacuum pump. $A^4$ is an opening through the top of the casing and B is a water inlet pipe which, as shown, is provided with a radial flange $B^1$, adapted to serve as a cover plate for the opening $A^4$ and which in use will be tightly, though removably, secured to the edges of the opening. As a means for securing the deflecting plates, to be described, to the cover, the pipe B is provided with another flange $B^2$, from which are suspended rods C, C, secured at their lower ends to outer portions of the upper deflecting plate. D indicates the uppermost deflecting plate, the plate being circular in form and provided with a central orifice E of less diameter than that of the inlet pipe B and of the column of water delivered by said pipe, said orifice being located to give passage to a portion only of the water of the column and surrounded by an upwardly extending rim or flange, indicated at F. $D^1$ indicates a second deflecting plate located below the plate D and, as shown, suspended from said plate by a series of rods $C^1$. This second deflecting plate is provided with an orifice $E^1$ of less cross-sectional area than the orifice E and this orifice, again, is provided with an upwardly extending annular rim, indicated at $F^1$. $D^2$ indicates a lowermost deflecting plate suspended from the plate $D^1$ by a series of rods $C^2$ and this deflecting plate is preferably provided with no orifice and is so shown. G, $G^1$ and $G^2$ are annular vertical rings, respectively located in the casing so as to intercept and direct downward the water delivered laterally from the deflecting plates in the form of more or less horizontal rings or annuli, preferably separated into segments as by the upward extensions from the surface of the deflecting plates formed by the suspending rods. The cylindrical rings are of progressively smaller diameter from above downward so that the sheets of water directed downward from the surfaces of the rings will in each case pass outside of the lower rings forming thus a series of water cylinders or curtains which, as they fall, are more or less divided into droplets so that gas and vapor can pass through them. As shown, the rings are supported on a series of brackets H extending radially inward from the wall of the casing and stepped as indicated at $H^1$, $H^2$ and $H^3$, to provide seats for the rings and by preference the rings are located in slots indicated at $H^4$, $H^5$, $H^6$, so that portions of the brackets, indicated at $H^7$, will extend inward beyond the inner surface of the rings and serve to divide the water cylinders delivered by the rings at least in their uppermost portion into segments.

In operation, the water outlet $A^1$ being connected to a barometric column and the gas outlet $A^3$ connected to a vacuum pump, vapor is delivered to the casing through the inlet A² and water introduced through the inlet B, entering the casing as a cylindrical column which is directed to the center of the deflecting plate D, a portion or core of the water column passing through the orifice E while the remainder, separated from such core by the annular flange F, impacts upon the surface of the deflecting plate D and is directed laterally by said plate and delivered therefrom in the form of an annular ring more or less segmented by reason of the obstruction offered by the upwardly extending rods C. The laterally directed sheet of water is intercepted by the ring G and falls vertically therefrom in the approximate form of a cylinder, the water falling, of course, with accelerating velocity so that as it passes downward it becomes thinner and more or less broken up into drops. The portion of the water column which passes through the orifice E contacts with the center of the deflecting plate D¹ and, here again, a core, so to speak, of the column passes through the orifice E¹ while the remainder of the column, separated from the core by the annular rim F¹, impacts upon the surface of the plate D¹ and is directed laterally and delivered as an annular ring of water more or less segmented by the rods C¹, the ring of water impacting on the vertical cylindrical ring G¹ and being directed downward again as a cylinder more or less broken up by reason of the acceleration. The portion of the water column which passes the orifice E¹ falls upon the deflecting plate D² which is provided with no orifice so that the entire volume of water is directed laterally and impacts on the cylindrical ring G² from which it falls as a more or less broken up cylinder of water. It will be understood that while I have shown two orificed deflecting plates, my invention would be fully embodied in a structure in which only one orificed plate was provided or in a structure having more than two orificed plates; in fact, the number of deflecting plates to be used would depend upon the size of the apparatus. It will be obvious that my improved apparatus provides for a distribution of the condensing water which will insure a maximum contact of the vapor and entrained gas with the water which, in turn, will lead to great efficiency while, at the same time, the distribution of the water as it passes through the casing is such as not to obstruct the upward flow of noncondensable gases to the outlet connected with the vacuum pump.

By suspending the deflecting plates from the detachable cover of the casing and making the opening of greater area than that of the deflecting plates, it is obvious that when it is desired to give access for repairs or cleaning or otherwise to the casing, the water inlet pipe cover and system of deflecting plates can be readily removed and as readily replaced.

The diffusion apparatus hereinabove described forms the subject matter of my Patent 2,068,094, granted January 19, 1937, and the essential novelty of my present invention, involving the use of such distributing apparatus in counter-current condensers, consists in the described features of construction in which the series of orificed deflecting plates is suspended from and removable with the cover plate of the condenser casing whereby the cleaning, repair, etc., of a condenser is greatly facilitated.

Having now described my invention, what I claim as new and desire to secure by Letters Patent, is:

In a counter-current condenser comprising a casing having an inlet for steam and an outlet for water at its bottom and an outlet for gases at its top and a series of ring baffles located in the casing on different levels and of progressively smaller diameter from above downward, said casing having a centrally located opening through its top of greater diameter than the larger of the horizontal deflecting plates located in the casing, a cover plate for closing said opening having an inlet nozzle for water extending therethrough and adapted to deliver a cylindrical body of water centrally in the casing, said cover plate having attached thereto and suspended therefrom a series of horizontal deflecting plates so spaced that each deflecting plate when in place will lie opposite to one of the ring baffles in the casing and each of the upper deflecting plates being formed with central circular openings of progressively smaller diameter from above downward, the larger opening in the uppermost plate being of smaller diameter than that of the column of water delivered through the inlet nozzle.

ALFRED L. WEBRE.